(12) United States Patent
Gabara (10) Patent No.: US 7,305,238 B2
(45) Date of Patent: Dec. 4, 2007

(54) POSITION-BASED CAPACITY RESERVATION IN A MOBILE WIRELESS SYSTEM

(75) Inventor: Thaddeus J. Gabara, Murray Hill, NJ (US)

(73) Assignee: Agere Systems Inc., Allentown, PA (US)

( * ) Notice: Subject to any disclaimer, the term of this patent is extended or adjusted under 35 U.S.C. 154(b) by 406 days.

(21) Appl. No.: 10/136,226

(22) Filed: May 1, 2002

(65) Prior Publication Data

US 2004/0203779 A1    Oct. 14, 2004

(51) Int. Cl.
H04Q 7/20    (2006.01)
(52) U.S. Cl. .................. 455/442; 455/436; 455/439
(58) Field of Classification Search ............... 455/440, 455/436, 439, 456, 522, 456.3, 457, 441, 455/442; 340/988; 342/457
See application file for complete search history.

(56) References Cited

U.S. PATENT DOCUMENTS

| 5,995,835 | A | * | 11/1999 | De Seze et al. | ............ | 455/436 |
| 6,157,835 | A | | 12/2000 | Findikli et al. | | |
| 6,591,103 | B1 | * | 7/2003 | Dunn et al. | .................. | 455/436 |
| 6,711,408 | B1 | * | 3/2004 | Raith | .......................... | 455/440 |
| 6,721,567 | B1 | * | 4/2004 | Wang et al. | ................. | 455/440 |

FOREIGN PATENT DOCUMENTS

| GB | 2 369 269 A | 5/2002 |
| GB | 2370 449 A | 6/2002 |
| WO | WO 98/35511 | 8/1998 |
| WO | WO 00/74419 A1 | 7/2000 |

OTHER PUBLICATIONS

Erbas F et al., "A Regular Path Recognition Method For Prediction of User Movements In Wireless Networks," IEEE 54th Vehicular Technology Conference, 2001, vol. 4, pp. 2672-2676, ISBN: 0 7803 7005 8.
Rajagopal et al., "GPS Based Predictive Resource Allocation In Cellular Networks," Proceedings 10th IEEE Conference on Networks, 2002, pp. 229-234, ISBN: 0 7803 7533 5.
Ming-Hsing Chiu, Bassouni M A, "Predictive Schemes For Handoff Prioritization In Cellular Networks Based on Mobile Positioning," IEEE J. Sel. Areas Commun. 2000, vol. 18, No. 3, pp. 510-522, ISSN: 0733 8716.

* cited by examiner

Primary Examiner—Duc M. Nguyen
Assistant Examiner—Wayne Cai (57) ABSTRACT

A wireless communication network includes position-based capacity reservation of base stations. Using, for example, the Global Positioning System (GPS), a mobile unit may periodically determine its position and communicate its position to base stations as the mobile unit moves through the network. In addition, the capacity needs of the mobile unit's connection may be communicated expressly by the unit or deduced from the connection itself. A network management system receives the position and capacity information of the mobile unit, and then estimates a route of the mobile unit through the network. Such route may be determined either 1) explicitly, given information transmitted by the mobile unit or 2) implicitly, by tracking the direction of movement of the mobile unit through the network. Consequently, the network management system may determine the availability of capacity of base stations along the estimated route through the network. Given this information, the network management system may take one or more of the following actions. First, capacity of each base station along the route may be reserved in anticipation of the mobile unit's arrival into the base station's coverage area. Second, base stations may be selected for handoff along the route and the identity of these base stations communicated to the mobile unit. Third, an alternative route may be communicated to the mobile unit, and that alternative route may include base stations having relatively greater available capacity. Fourth, directions may be provided to the mobile unit to bring the mobile unit closer, in position, to a base station.

24 Claims, 4 Drawing Sheets

POSITION-BASED CAPACITY RESERVATION IN A MOBILE WIRELESS SYSTEM

BACKGROUND OF THE INVENTION

1. Field of the Invention

The present invention relates to communication networks, and, more particularly, to accounting for a user's bandwidth needs as a user moves through a wireless communication network.

2. Description of the Related Art

A wireless telecommunication network includes a group of base stations that support multiple portable ("mobile") and fixed transceivers. For convenience, each transceiver is commonly termed a "unit." Each base station supports a number of logical connections with units within the base station's coverage area, sometimes referred to as a "cell." These logical connections may be through one or more physical connections transferring modulated and encoded data between each unit and the base station according to any number of communication techniques known in the art. Logical and physical connections are typically characterized by their available capacity for carrying data, expressed in bandwidth or data rate. For example, a logical connection of 64 kbps capacity may be implemented using two physical connections, each of 32 kbps capacity. Although a unit connection may be established with other units within the cell or wireless network, typically the unit's logical connection accesses an external network. External networks are generally land-based telecommunication systems, such as the POTS (plain old telephone service) network, dedicated data networks, and/or the Internet.

While a unit may send a request to the base station to establish a logical connection, generally the base station coordinates and controls the process of setting-up the portion of the connection between the base station and the unit. Base stations themselves may be linked to a call management system that coordinates actions of the base stations in the network. The call management system is typically responsible for establishing the portion of the connection from the base station to the external network. At a given point in time, each base station is supporting a different number of units within its coverage area, and the base stations may have different available bandwidth or services depending on their provisioning and equipment configuration.

When traveling through the wireless network, the unit shifts communication between base stations offering network access along the route taken by the unit. Shifting of communication between base stations, commonly known as "handoff," includes the process of maintaining a logical connection with one base station while negotiating a new logical connection with another base station. Generally, a unit may have several candidate base stations to select from when starting the process of setting up the new logical connection. Prior art networks generally employ a metric, such as signal-to-noise ratio and/or number of units currently served by the base station, during the negotiation process to select the base station for the new logical connection.

As popularity of wireless networks grows, such networks are increasingly pressured to offer greater capacity in logical connections to support relatively large file transfer, such as generated by Internet access, data-networking, and other types of wireless computer networking applications. However, since effects of handoff between base stations should be transparent to the logical connection, a connection with a large file transfer between a unit and one base station may have adequate capacity, but such capacity may not be available in the new connection after handoff of the connection to another base station. Without sufficient capacity, generally the data application coordinating the file transfer will "throttle-back" the connection, transferring data at a slower rate.

Recently many transceivers, such as units in a wireless network, are incorporating features that allow the transceiver to detect its position on the Earth. While many systems exist, such as LORAN and VOR in aircraft, by far the most widespread system in use is the Global Positioning System (GPS). GPS employs a group of satellites in geo-synchronous orbit, each satellite transmitting it's identification (ID) signal and a timing signal locked to a standard reference. A transceiver searches the sky for ID signals from at least three satellites of the GPS system. When three or more different ID signals are acquired, the corresponding timing signals are compared. The phase differences between timing signals represent delays caused by the different distances between the transceiver and each acquired satellite. With a priori information known through identification of each satellite, triangulation may be used to determine the transceiver's position on the Earth.

SUMMARY OF THE INVENTION

In accordance with embodiments of the present invention, a wireless communication network includes position-based capacity reservation of base stations. Using, for example, the Global Positioning System (GPS), a mobile unit may periodically determine its position and communicate its position to base stations as the mobile unit moves through the network. In addition, the capacity needs of the mobile unit's connection may be communicated expressly by the unit or deduced from the connection itself. A network management system receives the position and capacity information of the mobile unit, and then estimates a path of the mobile unit through the network. Such path may be determined either 1) explicitly, given information transmitted by the mobile unit or 2) implicitly, by tracking the direction of movement of the mobile unit through the network. Consequently, the network management system may determine the availability of capacity of base stations along the estimated route through the network. Given this information, the network management system may take one or more of the following actions. First, capacity of each base station along the route may be reserved in anticipation of the mobile unit's arrival into the base station's coverage area. Second, base stations may be selected for handoff along the route and the identity of these base stations communicated to the mobile unit. Third, an alternative path may be communicated to the mobile unit, and that alternative path may include base stations having relatively greater available capacity. Fourth, directions may be provided to the mobile unit to bring the mobile unit closer, in position, to a base station.

In one embodiment of the present invention, a mobile unit traversing a path through a network comprising a plurality of base stations identifies one or more base stations for handoff. The one or more base stations are identified by determining, by the mobile unit, its position; communicating position-related information to a network management system; and receiving identification of each base station for handoff from the network management system. The network management system selects each base station for handoff based on the position, a capacity of the base station, and a service requirement of the mobile unit.

In another embodiment of the present invention, a network management system identifies, for a mobile unit traversing a path through a network comprising a plurality of base stations, one or more base stations for handoff The one or more base stations are identified by receiving, by a network management system, position-related information from a mobile user; identifying, by the network management system, a capacity for a connection of the mobile unit; and selecting one or more base stations for handoff of the connection along the path. The network management system selects each base station for handoff based on the position, a capacity of the base station, and a service requirement of the mobile unit; and transmits the identification of each selected base station to the mobile unit.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention relates to position-based capacity reservation of base stations in a wireless communication network. Using, for example, the Global Positioning System (GPS), a mobile unit may periodically determine its position and communicate its position to base stations as the mobile unit moves through the network. In addition, the capacity needs of the mobile unit's connection may be communicated expressly by the unit or deduced from the connection itself. A network management system receives the position and capacity information of the mobile unit and estimates a route of the mobile unit through the network. Such route may be determined either 1) explicitly, given information transmitted by the mobile unit or 2) implicitly, by tracking the direction of movement of the mobile unit through the network. Consequently, the network management system may determine the availability of capacity of base stations along the estimated route through the network. Given this information, the network management system may take one or more of the following actions. First, capacity of each base station along the route may be reserved in anticipation of the mobile unit's arrival into the base station's coverage area. Second, base stations may be selected for handoff along the route and the identity of these base stations communicated to the mobile unit. Third, an alternative route may be communicated to the mobile unit, and that alternative route may include base stations having relatively greater available capacity. Fourth, directions may be provided to the mobile unit to bring the mobile unit closer, in position, to a base station.

While the present invention is described for reservation of capacity for bandwidth requirements of a user's connection, the present invention is not so limited. Other services associated with data connections, such as packet-based Quality of Service (QoS) guarantees, may employ the techniques described herein. In addition, QoS services such as minimum delay and bounds on dropped packets, may be translated into effective bandwidth values, and capacity reserved based on these effective bandwidth values.

Figure 1:
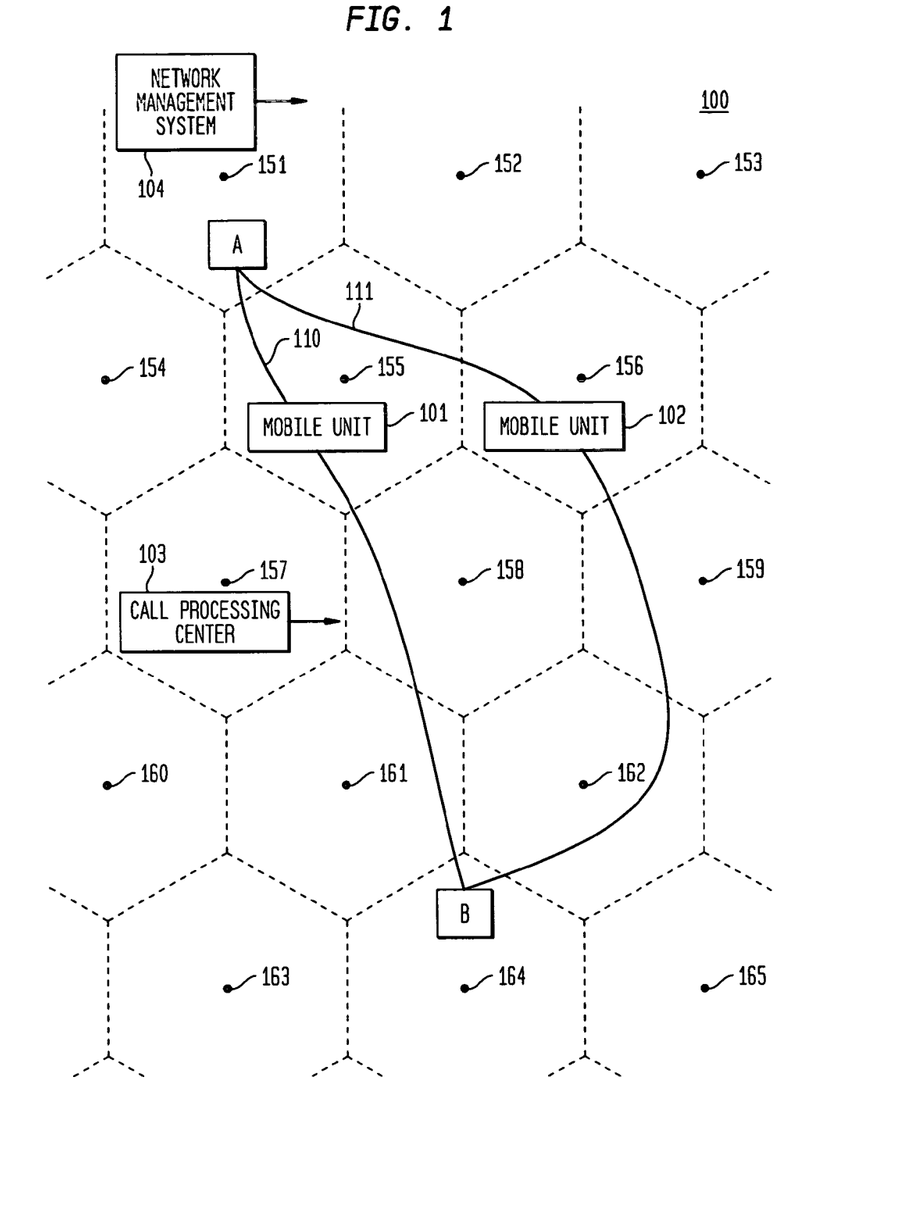
FIG. 1 shows a wireless network including position-based capacity reservation in accordance with exemplary embodiments of the present invention.

FIG. 1 shows a wireless network 100 including position-based capacity reservation in accordance with exemplary embodiments of the present invention. Wireless network 100 comprises base stations 151-165, call processing center 103, and network management system 104. Call processing center 103 and network management system 104 are coupled, either directly or indirectly, to base stations 151-165. Mobile units 101 and 102 traverse through network 100 along paths from A to B.

Each of the base stations 151-165 has a general range of coverage, termed a cell, shown in FIG. 1 as a dashed, hexagon-shaped boundary. However, each of the base stations 151-165 may send and receive signals beyond the dashed boundary in adjacent cells. Call processing center 103 coordinates the establishment of connections between network 100 and external networks such as the Internet, corporate data networks, or voice/voiceband data networks (e.g., POPS). Call processing center 103 may also provide services, such as billing, call-forwarding, or voice-mail services. Network management system 104 coordinates the use of network resources, such as capacity of base stations 151-165. Network management system 104 may also implement restoration for network faults (partial or complete failure of a base station or links connecting network 100 to external networks). Call processing center 103 and network management system 104 are shown as separate blocks in FIG. 1 for clarity. Both call processing center 103 and network management system 104 may account for multiple mobile units traveling through network 100. As known in the art, the functions of call processing center 103 and network management system 104 may be centralized or implemented in a distributed manner through the network. In addition, call processing center 103 and network management system 104 may be implemented by the same physical elements within network 100.

Figure 2:
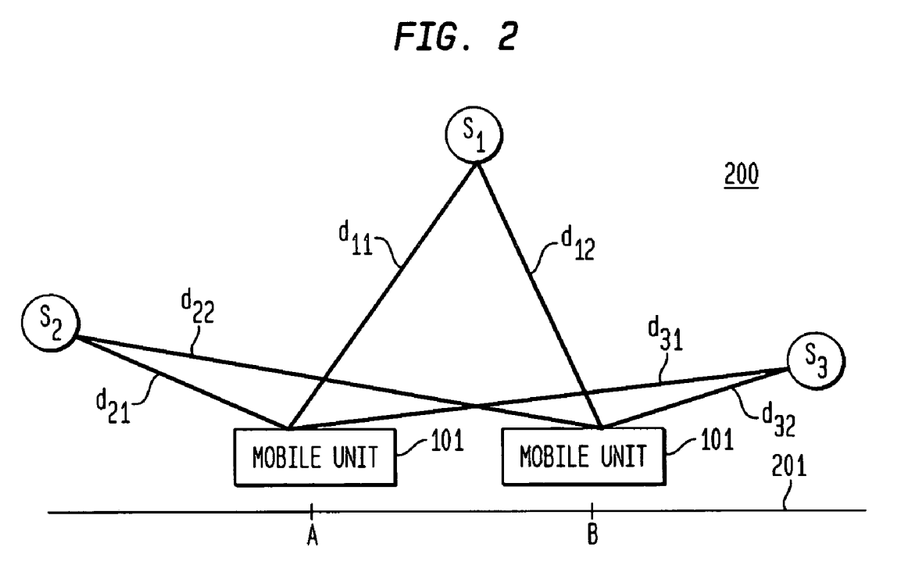
FIG. 2 illustrates a mobile unit of the network of FIG. 1 employing the Global Positioning System (GPS) to determine and communicate it's position to a base station.

Mobile units 101 and 102 communicate with one or more of base stations 151-165 using a wireless communication standard, such as CDMA (IS-95), PCS, or GSM as known in the art. In addition, mobile units 101 and 102 may determine their respective position on Earth using a navigation technique, such as the Global Positioning System (GPS). FIG. 2 illustrates a mobile unit of the network of FIG. 1 employing GPS to determine and communicate its position to a base station. Mobile unit 101 locates GPS satellites $S_1$, $S_2$, and $S_3$ while at, for example, point A. Satellites $S_1$, $S_2$, and $S_3$ each transmit a timing reference and an identification (ID) signal received by mobile unit 101. By comparing the timing information, mobile unit 101 computes the distances $d_{11}$, $d_{21}$, and $d_{31}$ from satellites $S_1$, $S_2$, and $S_3$, respectively. Given a priori information about the position of satellites $S_1$, $S_2$, and $S_3$ over the Earth, mobile unit 101 then uses triangulation to compute its position on the Earth from distances $d_{11}$, $d_{21}$, and $d_{31}$. When mobile unit 101 moves to point B, mobile unit 101 computes the new distances $d_{12}$, $d_{22}$, and $d_{32}$ from satellites $S_1$, $S_2$, and $S_3$ to update its position.

Returning to FIG. 1, in a first exemplary embodiment of the present invention, mobile unit 101 traverses from point A to point B over path 110. When in position A, mobile unit 101 requests a connection to an external network via communication over a supervisory (e.g., call set-up) channel with base station 151. The request may include a desired bandwidth and a minimum bandwidth for the connection. Call processing center 103 is informed and attempts to establish a connection with the external network. If the connection with the external network succeeds, base station 151 completes the connection with mobile unit 101. Alternatively, a request to establish a connection with mobile unit 101 may be initiated from the external network, in which case call processing center 103 attempts to locate mobile unit 101 and establish the connection between base station 151 and mobile unit 101. Once the connection is completed, mobile unit 101 determines its position via GPS, and communicates its position to network management system 104.

As mobile unit 101 moves along path 110 toward position B, mobile unit 101 nears adjacent base stations 154 and 155. In addition, mobile unit 101 continues to update its position and communicate the updated position to network management system 104. The changes in position of mobile unit 101 and the elapsed time for the changes in position to occur are employed by network management system 104 to determine both the average direction and average speed of mobile unit 101. Alternatively, mobile unit 101 may, itself, compute the average direction and average speed and communicate this information to network management system 104.

After tracking average direction and average speed for a certain period of time, network management system 104 may form an estimate of a portion of route 110 of mobile unit 101. With the estimate of route 110, network management system 104 determines that mobile unit 101 may pass within range of base stations 154, 155, 157, and 158. Network management system 104 compares the bandwidth of the connection of mobile unit 101 with the available capacity of base stations 154, 155, 157, and 158. Based on the comparison, network management system 104 selects those base stations having sufficient capacity, if available, for the connection of mobile unit 101.

In addition, network management system 104 may account for traffic patterns and usage (i.e., time of day/week/year and type of usage) when selecting base stations for a mobile unit's estimated route. Highway and similar traffic pattern information (e.g., congestion, flow rate, rubber necking) is becoming increasingly available, and some such pattern information may be obtained via the Internet. Network management system 104 may be coupled to external networks providing such traffic pattern information. With a mobile unit's positional information and traffic pattern information, network management system 104 may obtain better utilization of resources in network 100.

For example, network management system 104 may determine that base stations 155 and 157 have sufficient available capacity. Thus, network management system 104, through base station 151, communicates to mobile 101 that mobile 101 should first attempt hand-off to bases stations 155 and 157 when within range. Alternatively, network management system 104 may communicate to base stations 155 and 157 to increase their cell range (expand the dashed border) and base stations 154 and 158 to decrease their cell range (retract the dashed border). Since, in practice, most cells are defined with directive antennae, such increase and decrease need not move all sides of the hexagonal shape, but rather may be selective of each side. In addition, network management system 104 communicates with base stations 155 and 157 to reserve capacity for the connection. For the case of base station 155, the reservation may be immediate since mobile 101 is nearby. However, the reservation of capacity by base station 157 may be delayed to account for the time mobile unit 101 takes to travel within range of base station 157.

As mobile unit 101 continues toward point B, mobile unit 101 establishes handoff from base station 151 to base station 155 and then from base station 155 to base station 157. Mobile unit 101 continues to communicate its position to network management system 104. Network management system 104 continues to 1) update the estimated route of mobile 101, 2) determine and select base stations along the estimated route having sufficient capacity, 3) communicate the selected base stations to mobile unit 101, and 4) reserve capacity of the selected base stations for the connection.

In addition, network management system 104 may employ positional information of mobile unit 101 to give directions to mobile unit 101 that bring mobile unit 101 closer to a given base station. Since some high bandwidth services (e.g., those conforming to 802.11 standards) may be dependent upon signal to noise ratio (SNR), bringing mobile unit 101 closer to, for example, base station 155 may allow for a higher bandwidth service over the connection between mobile unit 101 and base station 155. Such directions may be indicated on a mobile unit's display with a simple arrow on the LCD screen.

In a second exemplary embodiment of the present invention, mobile unit 102 traverses from point A to point B. When in position A, mobile unit 102 requests a connection to an external network via communication over a supervisory (e.g., call set-up) channel with base station 151. The request may include a desired bandwidth and a minimum bandwidth for the connection. Call processing center 103 is informed and attempts to establish a connection with the external network. If the connection with the external network succeeds, base station 151 completes the connection with mobile unit 102. Alternatively, a request to establish a connection with mobile unit 102 may be initiated from the external network. Once the connection is completed, mobile unit 102 determines its position via GPS, and communicates its position to network management system 104.

In contrast to the first exemplary embodiment, mobile unit 102 of the second exemplary embodiment knows, a priori, its destination point B and communicates this destination point B to network management system 104. Given points A and B and the capacity requirement of the connection of mobile unit 102, network management system 104 examines the capacities of base stations 151-165 located relatively near the path between points A and B. Network management system 104 determines a subset BS of base stations 151-165 that provide coverage between points A and B and have sufficient capacity for the connection of mobile unit 102. Network management system 104 may account for traffic patterns and usage (i.e., time of day/week/year and type of usage) when selecting the subset BS.

For example, network management system 104 may determine that base stations 151, 155, 156, 159, 162, and 164 may provide the necessary capacity for the connection of mobile unit 102, while also satisfying one or more other optimization criteria, such as traffic distribution and load balancing. Thus, network management system 104 may then determine a route through network 100 between points A and B, shown in FIG. 1 as path 111. Such path may be specified as a series of points defined by latitude and longitude, general directions (e.g., four miles southeast, four miles south, and then three miles southwest), or as specific directions if a map database is available (e.g., follow State Street five miles southeast, turn right onto Davis Street and follow Davis Street six miles south).

Once determined, network management system 104, through base station 151, provides path 111 and subset BS of base stations 151-165 as a handoff sequence to mobile unit 102. Alternatively, only path 111 is provided if the handoff sequence is enforced by mobile unit 102 following path 111. In addition, network management system 104 communicates with each of the subset BS (e.g., base stations 151, 156, 159, 162, and 164) to reserve capacity at each base station for the connection. As described previously, such capacity reservation may be delayed to account for the time required for mobile unit 102 to reach each cell.

As mobile unit 102 moves along path 111 toward position B, mobile unit 102 continues to update its position and communicate the updated position to network management system 104. The changes in position of mobile unit 102 and the elapsed time for the changes in position to occur are employed by network management system 104 to determine both the average direction and average speed of mobile unit 102 for tracking. Alternatively, mobile unit 102 may, itself, compute the average direction and average speed and communicate this information to network management system 104. Network management system 104 tracks the position of mobile unit 102 along path 111 to detect whether mobile unit 102 deviates from path 111. If mobile unit 102 deviates from path 111, and/or communicates a new destination point, network management system 104 may determine a new route and an updated subset BS' of base stations 151-165 for the handoff sequence of the new route. Then network management system 104 reserves or releases capacity of base stations in network 100 based on the new route and updated subset BS of base stations 151-165 for the handoff sequence of the new route. If mobile unit 102 deviates from path 111, and does not communicate a new destination, then network management system 104 may employ the method described above for the first exemplary embodiment for position-based capacity reservation.

Figure 3:
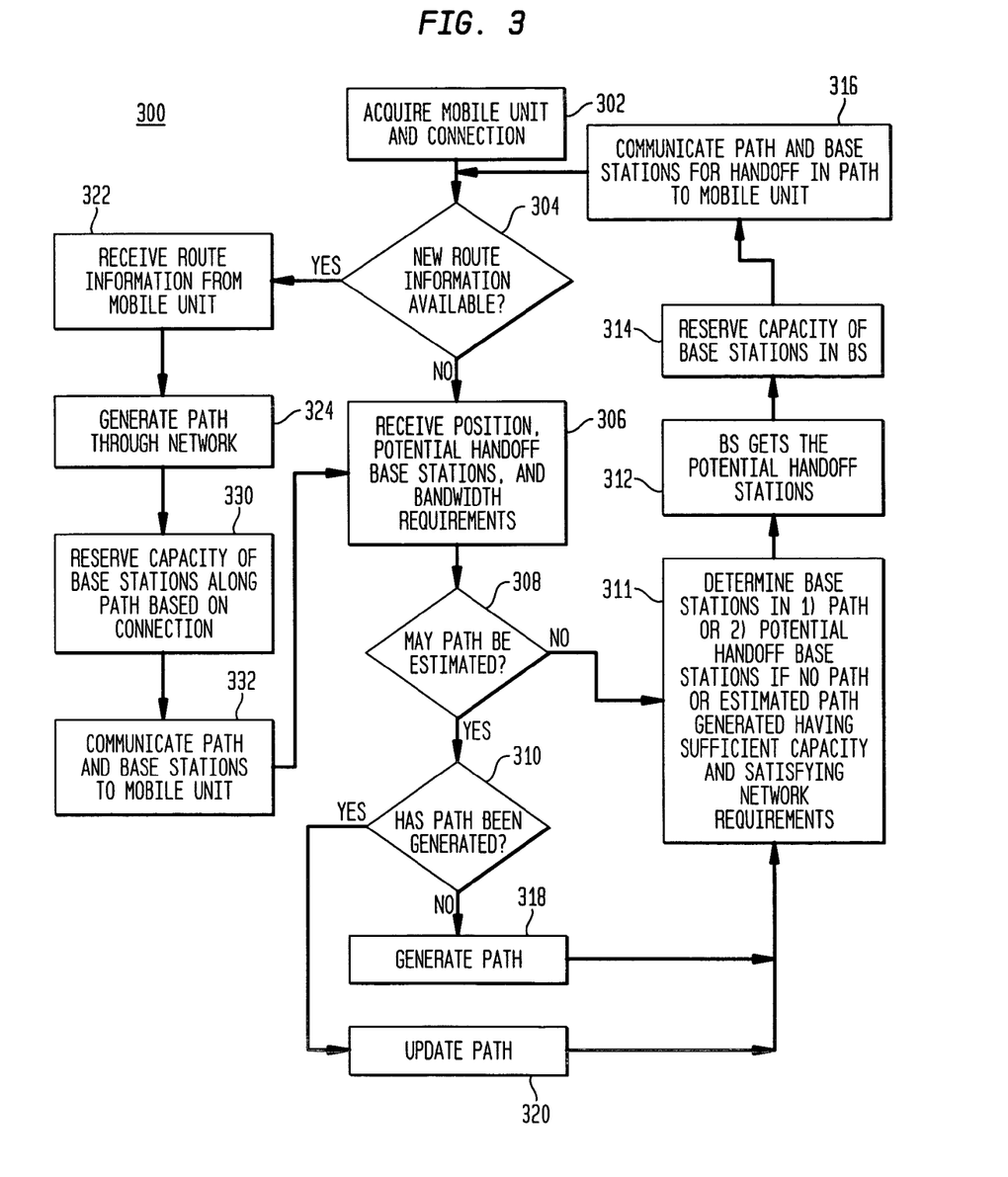
FIG. 3 shows a method of position-based capacity reservation employed by a network management system in accordance with an exemplary embodiment of the present invention.

FIG. 3 shows a method of position-based capacity reservation employed by a network management system in accordance with an exemplary embodiment of the present invention. At step 302, the mobile unit and its connection are acquired. At step 304, a test determines whether new route information of the mobile unit is available. New route information may be a portion of or the entire planned route, and may be the first instance of communicated route information by the mobile or an update/change in route. If the test of step 304 determines that new route information is not available, the method advances to step 306.

At step 306, the position, primary and potential handoff base stations, and bandwidth requirements of the mobile unit's connection are received. At step 308, a test determines whether an estimate of the mobile unit's path may be generated. The test may be based on whether sufficient data regarding the mobile unit's position and change in position has been received to allow relative certainty in direction and speed.

If the test of step 308 determines that the path cannot be estimated, such as if too few position points have been received or the mobile unit's position changes erratically, the method advances to step 31. At step 311, the capacity of each of the potential base stations for handoff is compared with the connection bandwidth requirements, and base stations that have sufficient capacity and meet other selection criteria for the handoff sequence are selected. At step 312, the subset BS is set to the selected base stations of the handoff sequence. At step 314, the capacity of base stations in subset BS is reserved for the connection, and, at step 316, the identity of the base stations in subset BS is communicated to the mobile unit. From step 316, the method returns to step 304.

If the test of step 308 determines that an estimate of the path can be calculated, the method advances to step 310. At step 310, a test determines whether a prior estimated path was calculated. If a prior estimated path was calculated, the method advances to step 320 to update the estimated path based on new information of the mobile unit's position; otherwise, the method advances to step 318. At step 318, an estimated path through the wireless network is generated and base stations having coverage over the path are identified. From either step 318 or 320, the method advances to step 311.

If the test of step 304 determines that route information is available, the method advances to step 322. At step 322, the network management system receives the route information from the mobile unit. Route information may include one or more of an origin, a destination, and direction(s) identified with GPS-derived positional information. At step 324, the route information is compared to the network topology information to generate a path through the network of base stations having sufficient capacity to support the bandwidth requirement of the mobile unit's connection. At step 330, the network management system reserves capacity at the base stations of the path for the connection, and, at step 332, information about the path, including the identity of base stations, is transferred to the mobile unit. From step 332, the method advances to step 306 for ongoing tracking of the mobile unit and updating of the path.

Figure 4:
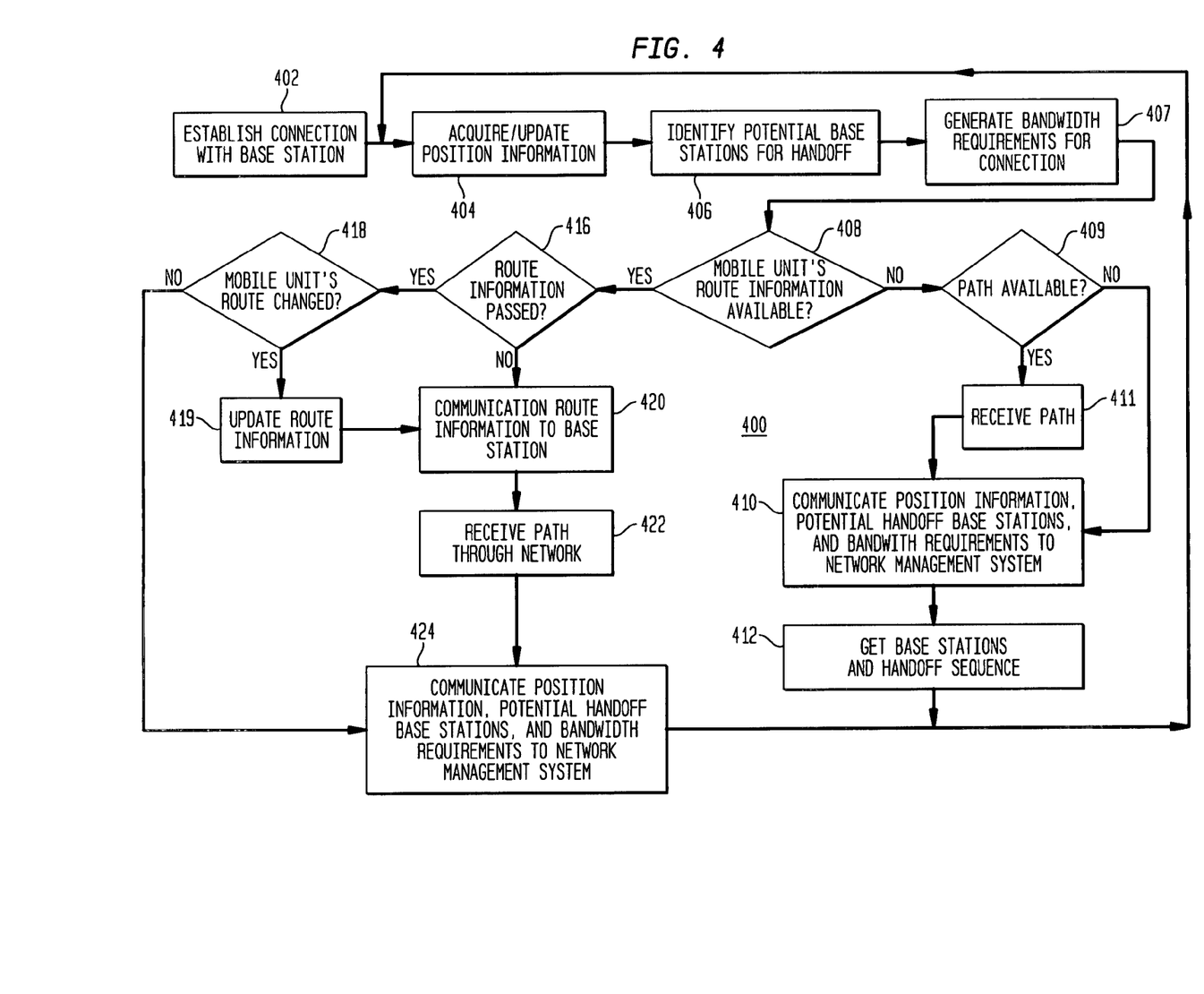
FIG. 4 shows a method of position-based capacity reservation employed by a mobile unit in accordance with the exemplary embodiment of the present invention.

FIG. 4 shows a method of position-based capacity reservation employed by a mobile unit in accordance with the exemplary embodiment of the present invention. At step 402, the mobile unit establishes a connection with a base station in the wireless network. At step 404, the mobile unit acquires or updates its position on the Earth, and hence its position in the wireless network, via GPS. At step 406, the mobile unit identifies potential base stations for handoff. At step 407, the mobile unit optionally generates bandwidth requirements for its connection (e.g., Internet connections may have higher bandwidth requirements than company data network connections). At step 408, a test determines whether the mobile unit has its route information available (a partial or whole route through the network including one or more of an origin, a destination, and direction(s) identified with GPS-derived positional information).

If the test of step 408 determines that the mobile unit has its route information available, the method advances to step 416. At step 416, a test determines whether the route information has been passed to the network management system. If the test of step 416 determines that the route information has not been passed, the method advances to step 420. At step 420, the route information is passed to the network management system, and, at step 422, the mobile unit receives information about the path through the network including the identity of base stations, and possibly bandwidth reservation and available services information, determined by the network management system. At step 424, the mobile unit communicates one or more of its position, potential base stations, and bandwidth requirements to the network management system. From step 424, the method returns to step 404.

If the test of step 416 determines that route information has been passed to the network management system, at step 418, a test determines whether the mobile unit's route has changed or deviated from the path provided by the network management system. If the test of step 418 determines that the mobile unit's route is unchanged, the method advances to step 424. If the test of step 418 determines that the mobile unit's route has changed, at step 419, the mobile unit's route information is updated, and the method advances to step 420.

If the test of step 408 determines that the mobile unit does not have route information available, the method advances to step 409. At step 409, a test determines whether a path through the network is available from the network management system. If the test of step 409 determines that a path is available from the network management system, at step 411 the path is received. If the test of step 409 determines that a path is not available, or after the path is received at step 411, the method advances to step 410. At step 410, the mobile unit communicates the current GPS-derived position, potential base stations for handoff, and (optionally) the connection bandwidth requirements to the network management system. At step 412, the mobile unit receives the set of base stations and handoff sequence from the network management system (corresponding to base stations with reserved capacity). From step 412, the method returns to step 404.

Position-based capacity reservation of base stations in a wireless communication network in accordance with embodiments of the present invention may provide the following advantages. First, capacity within the network may be utilized more efficiently by allocating connections to specific base stations that are underused while avoiding those base stations that are heavily used. Second, mobile units may experience faster data speeds if capacity for the connections is reserved up-front, reducing potential instances of throttle-back. Third, specific services may be made available to the mobile unit by selecting handoff only to those base stations supporting the services. Fourth, the service may be marketed to units as a premium service. Fifth, base station handoff may be coordinated using both a mobile unit's position and anticipated future position, which may provide a more efficient handoff process.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of identifying, by a mobile unit traversing a path through a network comprising a plurality of base stations, a sequence of two or more base stations for handoff, the method comprising the steps of:
   (a) determining, by the mobile unit, its position;
   (b) communicating, by the mobile unit, position-related information to a network management system;
   (c) receiving, by the mobile unit, identification of each base station of the entire sequence of two or more base stations for handoff from the network management system,
   wherein the network management system selects each base station of the sequence of two or more base stations for handoff based on the position, a capacity of the base station, and a service requirement of the mobile unit;
   (d) after completion of step (c), establishing handoff of the mobile unit from a current base station to a first base station in the sequence of two or more base stations; and
   (e) after completion of step (d), establishing handoff of the mobile unit from the first base station to a second base station in the sequence of two or more base stations.

2. The invention of claim 1, wherein, for step (a), the mobile unit determines its position via a navigational system.

3. The invention of claim 2, wherein, for step (a), the navigational system is a global positioning system (GPS).

4. The invention of claim 1, further comprising the step of (d) reserving, by the network management system, capacity of each base station for handoff based on the service requirement of the mobile unit.

5. The invention of claim 4, wherein, for step (d), the service requirement of the mobile unit is a bandwidth requirement of the connection.

6. The invention of claim 1, wherein, for step (c), each base station for handoff corresponds to a portion of the path traversed by the mobile unit.

7. The invention of claim 6, further comprising the step of defining the path by the mobile unit.

8. The invention of claim 6, further comprising the step of defining the path by the network management system.

9. The invention of claim 1, wherein step (b) further comprises the step of communicating at least one of its route, origin, destination, and potential base stations for handoff to the network management system.

10. The invention of claim 9, further comprising the step of estimating, by the network management system, the path based on the position and the at least one of the route, the origin, the destination, and the potential base stations for handoff.

11. A method of identifying, for a mobile unit traversing a path through a network comprising a plurality of base stations, a sequence of two or more base stations for handoff, the method comprising the steps of:
   (a) receiving, by a network management system, position-related information from the mobile unit;
   (b) identifying, by the network management system, a capacity for a connection of the mobile unit;
   (c) selecting the sequence of two or more base stations for handoff of the connection along the path, wherein the network management system selects each base station of the sequence of two or more base stations for handoff based on the position, a capacity of the base station, and a service requirement of the mobile unit;

(d) transmitting, by the network management system, the identification of each selected base station of the entire sequence of two or more base stations to the mobile unit;

(e) after completion of step (d), establishing handoff of the mobile unit from a current base station to a first base station in the sequence of two or more base stations; and (f) after completion of step (e), establishing handoff of the mobile unit from the first base station to a second base station in the sequence of two or more base stations.

12. The invention of claim 11, further comprising the step of (e) reserving capacity of each base station for handoff of the connection.

13. The invention of claim 11, further comprising the step of receiving route information from the mobile unit.

14. The invention of claim 13, further comprising the step of generating the path based on the route information.

15. The invention of claim 13, further comprising the step of updating the path based on the route information.

16. The invention of claim 11, wherein, for step (c), the service requirement of the mobile unit is a bandwidth requirement of the connection.

17. The invention of claim 11, wherein, for step (c), each base station for handoff defines a portion of a sequence having coverage over the path traversed by the mobile unit.

18. The invention of claim 17, further comprising the step of defining the path by the mobile unit.

19. The invention of claim 17, further comprising the step of defining the path by the network management system.

20. The invention of claim 11, further comprising the step of transmitting, to the mobile unit, directions to move the mobile unit closer, in position, to a selected base station.

21. A mobile unit having an apparatus for identifying, by the mobile unit traversing a path through a network comprising a plurality of base stations, a sequence of two or more base stations for handoff, the apparatus comprising:

a navigational module determining, by the mobile unit, its position;

a transmitter communicating position-related information from the mobile unit to a network management system; and a receiver obtaining at the mobile unit identification of each base station of the entire sequence of two or more base stations for handoff from the network management system, wherein:

the network management system selects each of the sequence of two or more base stations for handoff based on the position, a capacity of the base station, and a service requirement of the mobile unit;

after completion of the step of obtaining identification of each base station of the entire sequence of two or more base stations, the mobile unit is adapted to establish handoff of the mobile unit from a current base station to a first base station in the sequence of two or more base stations; and after completion of the step of establishing handoff to the first base station, the mobile unit is adapted to establish handoff of the mobile unit from the first base station to a second base station in the sequence of two or more base stations.

22. Network management system for identifying, for a mobile unit traversing a path through a network comprising a plurality of base stations, a sequence of two or more base stations for handoff, the apparatus comprising:

a receiver configured to obtain position-related information from the mobile unit;

a processor configured to:
(1) identify a capacity for a connection of the mobile unit;
(2) select the sequence of two or more base stations for handoff of the connection along the path, wherein the network management system selects each base station of the sequence of two or more base stations for handoff based on the position, a capacity of the base station, and a service requirement of the mobile unit; and a transmitter configured to provide, from the network management system, the identification of each selected base station of the entire sequence of base stations to the mobile unit;

wherein:

after completion of the step of providing identification of each base station of the entire sequence of two or more base stations to the mobile unit, the mobile unit is adapted to establish handoff of the mobile unit from a current base station to a first base station in the sequence of two or more base stations; and after completion of the step of establishing handoff to the first base station, the mobile unit is adapted to establish handoff of the mobile unit from the first base station to a second base station in the sequence of two or more base stations.

23. A computer-readable medium having stored thereon a plurality of instructions, the plurality of instructions including instructions which, when executed by a processor, cause the processor to implement a method of identifying, by a mobile unit traversing a path through a network comprising a plurality of base stations, a sequence of two or more base stations for handoff, the method comprising the steps of:

(a) determining, by the mobile unit, its position;

(b) communicating, by the mobile unit, position-related information to a network management system;

(c) receiving, by the mobile unit, identification of each base station of the entire sequence of two or more base stations for handoff from the network management system, wherein the network management system selects each base station of the sequence of two or more base stations for handoff based on the position, a capacity of the base station, and a service requirement of the mobile unit;

(d) after completion of step (c), establishing handoff of the mobile unit from a current base station to a first base station in the sequence of two or more base stations; and (e) after completion of step (d), establishing handoff of the mobile unit from the first base station to a second base station in the sequence of two or more base stations.

24. A computer-readable medium having stored thereon a plurality of instructions, the plurality of instructions including instructions which, when executed by a processor, cause the processor to implement a method of identifying, for a mobile unit traversing a path through a network comprising a plurality of base stations, a sequence of two or more base stations for handoff, the method comprising the steps of:

(a) receiving, by a network management system, position-related information from the mobile unit;

(b) identifying, by the network management system, a capacity for a connection of the mobile unit;

(c) selecting the sequence of two or more base stations for handoff of the connection along the path, wherein the network management system selects each base station of the sequence of two or more base stations for handoff based on the position, a capacity of the base station, and a service requirement of the mobile unit; and (d) transmitting, by the network management system, the identification of each base station of the entire sequence of two or more base stations to the mobile unit;

wherein:

after completion of step (d), the mobile unit is adapted to establish handoff of the mobile unit from a current base station to a first base station in the sequence of two or more base stations; and after completion of the step of establishing handoff to the first base station, the mobile unit is adapted to establish handoff of the mobile unit from the first base station to a second base station in the sequence of two or more base stations.

* * * * *

UNITED STATES PATENT AND TRADEMARK OFFICE
CERTIFICATE OF CORRECTION

PATENT NO.         : 7,305,238 B2                                  Page 1 of 1
APPLICATION NO. : 10/136226
DATED              : December 4, 2007
INVENTOR(S)        : Thaddeus J. Gabara It is certified that error appears in the above-identified patent and that said Letters Patent is hereby corrected as shown below:

On the Title Page, Item -56-
In Other Publications, please insert --"Call Admission based on Interference in DS-CDMA Cellular Systems," Tugeu T., C. Ersoy, Proc. Of 4th European Personal Mobile Communications Conference, EPMC'2001, Vienna, Austria, Feb 2001 (4 pages).--.

Signed and Sealed this

Thirteenth Day of May, 2008

JON W. DUDAS
*Director of the United States Patent and Trademark Office*